United States Patent [19]

Wiest et al.

[11] 4,044,197

[45] Aug. 23, 1977

[54] THERMALLY SELF-CROSS-LINKABLE ETHYLENE/VINYL ACETATE COPOLYMERS

[75] Inventors: Hubert Wiest; Erwin Lieb; Heinz Schafer, all of Burghausen, Germany

[73] Assignee: Wacker-Chemie GmbH, Munich, Germany

[21] Appl. No.: 651,610

[22] Filed: Jan. 22, 1976

[30] Foreign Application Priority Data

Mar. 21, 1975 Germany .............................. 2512589
Nov. 17, 1975 Germany .............................. 2551556

[51] Int. Cl.² .......................................... C08F 210/02
[52] U.S. Cl. ..................................... 526/304; 528/503
[58] Field of Search ........................... 526/304; 528/503

[56] References Cited

U.S. PATENT DOCUMENTS

| | | | |
|---|---|---|---|
| 3,231,533 | 1/1966 | Garrett et al. | 526/304 |
| 3,288,740 | 11/1966 | Maeder et al. | 526/304 |
| 3,326,868 | 6/1967 | Tucker | 526/304 |
| 3,451,982 | 6/1969 | Mortimer | 526/304 |
| 3,682,871 | 8/1972 | Mikofalvy et al. | 526/304 |
| 3,755,233 | 8/1973 | Fallwell | 526/304 |
| 3,799,910 | 3/1974 | Shingai et al. | 526/304 |

*Primary Examiner*—Harry Wong, Jr.
*Attorney, Agent, or Firm*—Hammond & Littell

[57] ABSTRACT

A thermally self-cross-linkable ethylene/vinyl acetate copolymer consisting essentially of the following monomer units:

a. from 5 to 50% by weight of ethylene,
b. from 30 to 87% by weight of vinyl acetate,
c. from 2 to 10% by weight of a copolymerizable compound containing an N-methylol group,
d. from 5 to 20% by weight of an acryl compound selected from the group consisting of alkyl acrylate and alkyl methacrylate where alkyl has from 1 to 10 carbon atoms,
e. from 0.5 to 3% by weight of a mono-olefinically-unsaturated carboxylic acid, and
f. up to 1% by weight of a poly-olefinically-unsaturated monomer, and having a glass transition temperature of between $-40°$ and $+10°$ C; as well as the process for its preparation.

10 Claims, No Drawings

THERMALLY SELF-CROSS-LINKABLE ETHYLENE/VINYL ACETATE COPOLYMERS

RELATED ART

Aqueous copolymer dispersions of ethylene and vinyl acetate monomer units are used frequently as binders because of their readily accessible monomers and their good technical properties. The additional copolymerization of N-methylol acrylamide monomer units yields polymers which are self-cross-linking at elevated temperature. U.S. Pat. No. 3,345,318 and British Pat. No. 1,317,672 describe such aqueous copolymer dispersions as adhesives for textiles and as binders for non-woven fabrics. The attainable cross-linkage is relatively loose and incomplete. Films of these dispersions, after thermal cross-linking, have a good wet strength, but the resistance to solvents leaves much to be desired. Wash-fast non-woven fabrics can be produced with them, but these non-woven fabrics will not withstand the stresses of repeated dry-cleaning. The use of increased contents of N-methylol-compound monomer units as cross-linking agents does not improve the resistance of the so-bound non-woven fabrics to water and solvents either.

OBJECTS OF THE INVENTION

An object of the present invention is the obtaining of copolymers which are self-cross-linking at elevated temperature and which are suitable for the production of detergent- and solvent-resistant films or coatings to withstand the stresses of repeated dry cleaning, for example. The copolymers should have a glass transition temperature which yields the desired softness for coating woven-and non-woven fabrics and finishes.

Another object of the present invention is the obtaining of a thermally self-cross-linkable ethylene/vinyl acetate copolymer consisting essentially of the following monomer units:
  a. from 5 to 50% by weight of ethylene,
  b. from 30 to 87% by weight of vinyl acetate,
  c. from 2 to 10% by weight of a mono-olefinically-unsaturated compound capable of copolymerizing and containing an N-methylol group,
  d. from 5 to 20% by weight of an acryl compound selected from the group consisting of alkyl acrylate and alkyl methacrylate where alkyl has from 1 to 10 carbon atoms,
  e. from 0.5 to 3% by weight of an unsaturated acid selected from the group consisting of alkenoic acids having from 3 to 6 carbon atoms and alkenedioic acids having from 4 to 6 carbon atoms, and
  f. from 0 to 1% by weight of a poly-olefinically-unsaturated monomer copolymerizable with vinyl acetate and ethylene, said copolymer having a glass transition temperature of between −40° and +10° C.

A further object of the present invention is the method of producing the above thermally self-cross-linkable ethylene/vinyl acetate copolymer.

These and other objects of the invention will become more apparent as the description thereof proceeds.

DESCRIPTION OF THE INVENTION

The above objects have been achieved and the drawbacks of the prior art have been overcome by the present discovery of a thermally self-cross-linkable ethylene/vinyl acetate copolymer which is characterized in that the copolymer consists of the following monomer units:
  a. from 5 to 50% by weight of ethylene,
  b. from 30 to 87% by weight of vinyl acetate,
  c. from 2 to 10% by weight of a copolymerizable N-methylol compound,
  d. from 5 to 20% by weight of alkyl acrylates or alkyl methacrylates having from 1 to 10 carbon atoms in the alkyl,
  e. from 0.5 to 3% by weight of an olefinically-unsaturated carboxylic acid, and
  f. up to 1% by weight of polyunsaturated copolymerizable monomers, said copolymer having a glass transition temperature of between −40° and +10° C.

More particularly, the invention relates to a thermally self-cross-linkable ethylene/vinyl acetate copolymer consisting essentially of the following monomer units:
  a. from 5 to 50% by weight of ethylene,
  b. from 30 to 87% by weight of vinyl acetate,
  c. from 2 to 10% by weight of a mono-olefinically-unsaturated compound capable of copolymerizing and containing an N-methylol group,
  d. from 5 to 20% by weight of an acryl compound selected from the group consisting of alkyl acrylate and alkyl methacrylate where alkyl has from 1 to 10 carbon atoms,
  e. from 0.5 to 3% by weight of an unsaturated acid selected from the group consisting of alkenoic acids having from 3 to 6 carbon atoms and alkenedioic acids having from 4 to 6 carbon atoms, and
  f. from 0 to 1% by weight of a poly-olefinically-unsaturated monomer copolymerizable with vinyl acetate and ethylene, said copolymer having a glass transition temperature of between −40° and +10° C.

The above thermally self-cross-linkable ethylene/vinyl acetate copolymer is produced by emulsion polymerization of a monomer mixture of
  a. from 5 to 50% by weight of ethylene,
  b. from 30 to 87% by weight of vinyl acetate,
  c. from 2 to 10% by weight of a copolymerizable N-methylol compound in the aqueous system in the presence of emulsifiers and free-radical formers and, optionally, other polymerization aids characterized in that
  d. from 5 to 20% by weight of alkyl acrylates or alkyl methacrylates having from 1 to 10 carbon atoms in the alkyl,
  e. from 0.5 to 3% by weight of an olefinically-unsaturated carboxylic acid and
  f. up to 1% by weight of polyunsaturated copolymerizable monomers, are copolymerized under an ethylene pressure of 10 to 100 atmospheres gauge, preferably 20 to 80 atmospheres gauge. The polymerization is effected mostly up to a solids content of 40 to 60% by weight. More particularly, therefore, the invention relates to a process for the production of the above thermally self-cross-linkable ethylene/vinyl acetate copolymer consisting essentially of the steps of copolymerizing a monomer mixture of
  a. ethylene in an amount sufficient to give from 5 to 50% by weight of monomer units in the final copolymer,
  b. from 30 to 87% by weight of vinyl acetate, c. from 2 to 10% by weight of a monoolefinically-unsaturated compound capable of copolymerizing and containing an N-methylol group, d. from 5 to 20% by weight of an acryl compound selected from the group consisting of alkyl acrylate and alkyl methacrylate where alkyl has from 1 to 10 carbon atoms, e. from 0.5 to 3% by weight of an unsaturated acid selected from the group consisting of alkenoic acids having from 3 to 6 carbon atoms and alkenedioic acids having from 4 to 6 carbon atoms, and f. from 0 to 1% by weight of a poly-olefinically-unsaturated monomer copolymerizable with vinyl acetate and ethylene, in an aqueous system in the presence of emulsifiers and free-radical-forming polymerization catalysts under an ethylene pressure of from 10 to 100 atmospheres gauge at a temperature and for a time sufficient to effect copolymerization, and recovering said thermally self-cross-linkable ethylene/vinyl acetate copolymer having a glass transition temperature of between −40° and +10° C.

The copolymers according to the invention are suitable for the production of detergent-resistant and solvent-resistant films, coatings or binders, when they are cross-linked at temperatures of from 110° to 170° C, preferably 120° to 160° C for a period of from 0.1 to 5 minutes, preferably 2 to 4 minutes.

It was surprising to find that with the copolymers, according to the invention, it was possible to successfully produce thermally self-cross-linkable copolymers which have the desired degree of plasticity for coating woven and non-woven fabrics and finishes and which show in the crosslinked state not only excellent resistance to aqueous solutions but also to organic solvents, which is necessary, for example, in repeated dry-cleaning, and which copolymers can be produced without difficulties in a relatively simple manner in one step.

In addition to the components (a) and (b), component (c) is a copolymerizable N-methylol compound such as a mono-olefinically-unsaturated compound capable of copolymerizing with ethylene and vinyl acetate and containing an N-methylol group. Such compounds are, for example, N-methylol acrylamide, N-methylol methacrylamide or lower alkanol ethers thereof, or mixtures thereof. The component (c) can be employed in amounts to give from 2 to 10% by weight of monomer units in the final copolymer.

The alkyl acrylates or alkyl methacrylates of component (d) having from 1 to 10 carbon atoms in the alkyl are, for example, those esters of straight-chained or branchchained alkanols having from 1 to 10 carbon atoms. These are particularly ethyl, propyl, butyl, tert. butyl, 2-ethylhexyl acrylate or the corresponding methacrylate. They are used in sufficient amounts to give between 5 and 20% by weight, preferably 8 to 15% by weight of monomer units in the final copolymer.

The olefinically-unsaturated carboxylic acids of component (e) are the alkenoic acids having from 3 to 6 carbon atoms or the alkenedioic acids having from 4 to 6 carbon atoms, like acrylic acid, methacrylic acid, crotonic acid, maleic acid or fumeric acid, or mixtures thereof in amounts sufficient to give between 0.5 and 3% by weight, of monomer units in the final copolymer. In addition, certain copolymerizable monomers which assist in the stability of the copolymer emulsion, like acrylamide and vinyl sulfonic acid, are helpful in the polymerization process for the production of stable emulsion. These optionally present monomers, if employed, are added in very low amounts of from 0 to 0.2% by weight of the monomer mixture.

Component (f), the polyunsaturated copolymerizable monomer, is optional in the copolymers of the invention. It is employed in amounts of up to 1% by weight of monomer units, or from 0 to 1% by weight. However, it is of particular advantage to employ these polyunsaturated copolymerizable monomers. They are preferably employed in amounts of from 0.001 to 1% by weight, advantageously from 0.01 to 1% by weight, based on the total weight of monomer units in the copolymer. Preferably, component (f) is at least one polyolefinically-unsaturated monomer copolymerizable with vinyl acetate and ethylene, such as lower alkenyl lower alkenoates, for example, vinyl crotonate, allyl acrylate, allyl methacrylate; di-lower alkenyl alkanedioates, for example, divinyl adipate, diallyl adipate; di-lower alkenyl benzenedicarboxylates, for example, diallyl phthalate; lower alkanediol di-lower alkenoates, for example, ethylene glycol diacrylate, ethylene glycol dimethacrylate, butanediol diacrylate, butanediol dimethacrylate; lower alkylene bisacrylamides and lower alkylene bis-methacrylamides, for example, methylene bis-acrylamide; triallyl cyanurate; etc. Preferably allyl acrylate or allyl methacrylate is employed in amounts of from 0.01 to 1% by weight, based on monomer units in the copolymer.

The use of the acrylate monomers of component (d) in the amounts according to the invention yields an unexpected improvement of the detergent-resistant and solvent-resistance of the crosslinked products, which had not previously been achieved by increasing the N-methylol portion in the copolymer.

By varying the ethylene content in the copolymers of the invention, it is possible to obtain the desired degree of plasticity for use by the copolymer as a binder in the woven and non-woven fabrics, coatings and finishes. The ethylene content in the end product is determined by the ethylene pressure during the polymerization. In order to obtain ethylene monomer unit contents of between 5 and 50% by weight, ethylene pressures of between 10 and 100 atmospheres gauge, preferably between 20 and 80 atmospheres gauge, are selected at polymerization temperatures of between 0° C and 70° C, preferably 30° to 60° C.

The remaining monomer components are charged in substantially the amounts desired for the monomer units in the copolymer, since these monomers undergo substantially complete copolymerization.

The emulsion polymerization can be effected in several different ways. In one method, the water and emulsifiers or dispersing agents are charged and the monomer components (a) to (f) are added thereto over the course of the polymerization. It is also possible to charge a part of the monomeric components (a), (b) and (d) at once, and to add the other components in doses as the polymerization progresses. To this and only a part of the dispersing medium consisting of water and emulsifiers and the optional protective colloid is charged and heated to the polymerization temperature. The monomers are dispersed in the remaining dispersing medium and water and dosed in at a rate corresponding to the progress of the polymerization that the components (b) and (d) in monomeric form are kept between 4 and 10% by weight of the entire polymerization recipe during the polymerization. The polymerization process can be carried out continuously or intermittently. In the procedure according to the invention, stable, coagulate-free dispersions are obtained with a solids content of between 40 and 60% by weight, which have a sufficiently low viscosity to ensure an adequate heat transfer in standard stirring autoclaves.

Suitable as polymerization catalysts are the water-soluble free-radical-formers generally used in emulsion polymerization, such as hydrogen peroxide, sodium persulfate, potassium persulfate and ammonium persulfate, as well as tert. butyl hydroperoxide, in amounts of between 0.01 and 3% by weight, preferably 0.01 and 1% by weight based on the total amount of the emulsion. They can be used alone or together with reducing agents such as sodium formaldehyde-sulfoxylate, iron-II-salts, sodium dithionite, sodium hydrogen sulfite, sodium sulfite, sodium thiosulfate, as redox catalysts in amounts of 0.01 to 3% by weight, preferably 0.01 to 1% by weight, based on the total amount of the emulsion. The free-radical-formers can be charged in the aqueous emulsifier solution or be added during the polymerization in doses. Furthermore, the redox catalyst system described in German Pat. Nos. 1,133,130 and 1,745,567, which consists of precious metals of Group VIII of the periodic system of elements, inorganic or organic peroxides, hydrogen as a reducing agent and, optionally, heavy metal-ions, can likewise be used.

The polymerization is carried out at a pH of between 2 and 7, preferably between 3 and 5. In order to maintain the pH range, it may be useful to work in the presence of customary buffer systems, for example, in the presence of alkali metal acetates, alkali metal carbonates, alkali metal phosphates. Polymerization regulators, like mercaptans, aldehydes, chloroform, methylene chloride and trichloroethylene, can also be added in some cases.

The dispersing agents are all the emulsifiers generally used in emulsion polymerization, as well as optionally present protective colloids. It is also possible to use emulsifiers alone or in mixtures with protective colloids.

The emulsifiers can be anionic, cationic or non-ionic surface-active compounds. Suitable anionic emulsifiers are, for example, alkyl sulfonates, alkylaryl sulfonates, alkyl sulfates, sulfates of hydroxyalkanols, alkyl and alkylaryl disulfonates, sulfonated fatty acids, sulfates and phosphates of polyethoxylated alkanols and alkylphenols, as well as esters of sulfosuccinic acid. Suitable cationic emulsifiers are, for example, alkyl quaternary ammonium salts, alkyl quaternary phosphonium salts and alkyl ternary sulfonium salts. Examples of suitable non-ionic emulsifiers are the addition products of 5 to 50 mols of ethylene oxide adducted to straight-chained and branch-chained alkanols with 6 to 22 carbon atoms, or alkylphenols, or higher fatty acids, or higher fatty acid amides, or primary and secondary higher alkyl amines; as well as block copolymers of propylene oxide with ethylene oxide and mixtures thereof. Preferably non-ionic and/or anionic emulsifiers are used as emulsifying agents in amounts of 1 to 6% by weight of the polymerisate.

Suitable protective colloids optionally employed are partially or completely saponified polyvinyl alcohol with degress of hydrolyzation of between 79% and 92% and 89% to 100% and viscosities of between 3 and 48 cP, measured as a 4% aqueous solution at 20° C, water-soluble cellulose ether derivatives, like hydroxyethyl cellulose, hydroxypropyl cellulose, methylcellulose or carboxymethyl cellulose, water-soluble starch ethers, polyacrylic acid or water-soluble polyacrylic acid copolymers with acrylamide and/or alkyl acrylates, poly-N-vinyl compounds of open-chained or cyclic carboxylic acid amides, and mixtures thereof.

The dispersions according to the invention have a glass transition temperature of between $-40°$ and $+10°$ C and dry to flexible films. They are cross-linked in a weakly acid pH range by temperature shock. The optimum crosslinking temperatures are between 100° and 170° C, preferably between 130° and 160° C. At 150° C the crosslinking time is from 0.1 to 5 minutes, depending on the film thickness. The crosslinked films have a higher strength and a better resistance to aqueous and organic media, and are, moreover, faster crosslinked than presently known copolymers. Acid catalysts accelerate the crosslinking. Such acid catalysts are mineral acids or organic acids, such as phosphoric acid, tartaric acid, citric acid, or acid salts, such as chromium-III salts, aluminum chloride, ammonium chloride, zinc nitrate or magnesium chloride. A particular advantage is that the films do not discolor on crosslinking or only slightly so.

The copolymer dispersions according to the invention are characterized by good mechanical and storage stability, despite their crosslinking capacity. They can be mixed with known antifoam agents, wetting agents, fillers, watersoluble urea, melamine, and phenol resins, plasticizers and solvents.

The dispersions according to the invention adhere firmly on natural or synthetic fibers and are particularly suitable as wet and dry-cleaning resistant binders for textile coverings and coatings, as binders for nonwoven fabrics and as finishes. They can be applied in a known manner by rolling, dipping and spraying. Furthermore, they can be used as film-forming binders for wet strength and solvent-resistant pastes and paints.

The following examples illustrate the practice of the invention without being limitative in any respect.

EXAMPLE 1

A 20 liter autoclave equipped with a stirrer, adjustable cooling and heating means and several dosing means was employed. 250 gm of tridecyl polyethylene oxide ether with 15 mols of ethylene oxide, 5 gm of sodium alkylsulfonate $-(C_{12}-C_{14})-$, 20 gm of sodium vinyl-sulfate and 200 mg of iron ammonium sulfate, dissolved in 7500 gm of water, were charged into the autoclave. After removing the atmospheric oxygen by evacuation and purging with nitrogen, 30 cc of a 0.1% palladium sol and 500 gm of a monomer mixture, consisting of 4500 gm of vinyl acetate, 500 gm of butyl acrylate, 5 gm of vinyl crotonate, and 50 gm of acrylic acid were added and the mixture was heated under stirring to 40° C. Thereafter, ethylene was pumped in under stirring up to a pressure of 55 atmospheres gauge. Then two atmospheres gauge of hydrogen were empressed in the autoclave, and the polymerization was started by dosing in a 3.5% potassium persulfate solution. 10 minutes after the start of the polymerization, the remaining monomer mixture was dosed in constantly at a rate of 700 gm/h. At the time a mixture consisting of 240 gm of N-methylol acrylamide and 600 gm water was dosed in continuously over a period of 6 hours. The dosing of the catalyst solution was so effected that the content of monomeric vinyl acetate and butyl acrylate in the reaction mixture was from 4 to 10% during the polymerization. The ethylene pressure was kept uniformly at 55 atmospheres gauge until the addition of the monomers was completed. Then the polymerization was continued for another 2 hours, adding more catalyst solution, so that a total of about 600 ml of catalyst solution was used. The dispersion was then cooled and liberated of foam and residual monomers by light evacuation.

A stable, finely divided and coagulate-free emulsion with a solid content of 46% was obtained. The ethylene content of the plastic, slightly sticky film formed from the dispersion was 25% by weight. The tensile strength of the film was 0.5 N/mm$^2$. On tempering for 5 minutes at 150° C, it increased to 3.7 N/mm$^2$. The film becomes practically non-sticky after self-cross-linking. For further values for the dispersion and film, see Table 1 at the end of the specification.

COMPARISON EXAMPLE 2

The procedure was as in Example 1, but no butyl acrylate was employed in the monomer mixture, and 5000 gm of vinyl acetate instead of 4500 gm was employed. A stable 45% dispersion was obtained with a low portion of agglomerates, whose ethylene content was 25%. The tensile strength of the untempered film was 0.5 N/mm$^2$. By tempering for 5 minutes at 150° C, it increased to 2.5 N/mm$^2$ (see also Table 1).

EXAMPLE 3

The procedure was as in Example 1, but instead of 7500 gm only 5000 gm of water was employed, and an ethylene pressure of 28 atmospheres gauge was also employed. A stable, finely divided and coagulate-free dispersion was obtained with 50% solids content and an ethylene content of 12% in the copolymer. The tensile strength of the untempered film is 2.5 N/mm$^2$, that of the tempered film is 6.5 N/mm$^2$ (see also Table 1).

EXAMPLE 4

The reactor described in Example 1 was employed and charged with 100 gm of tridecyl polyethylene oxide ether with 8 mols of ethylene oxide, 200 gm of nonylphenol polyethylene oxide ether with 30 mols of ethylene oxide, 10 gm of sodium alkyl —($C_{12}$-$C_{14}$)— sulfonate, 30 gm of sodium vinylsulfonate and 200 mg of iron ammonium sulfate dissolved in 7500 gm of water. After removing the atmospheric oxygen by evacuation and purging with nitrogen, 50 cc of a 0.1% palladium sol, 250 gm of a monomer mixture consisting of 3100 gm of vinyl acetate, 800 gm of butyl acrylate, 70 gm of acrylic acid and 50 gm of methylene bis-acrylamide, were added and the mixture was heated under stirring to 40° C. Then ethylene was empressed with stirring up to a pressure of 75 atmospheres gauge. After empressing a further two atmospheres gauge of hydrogen, the polymerization was started by dosing in 3.5% potassium persulfate solution.

After the start of the polymerization, the remaining monomer mixture was dosed in at a rate of 700 gm/h, as well as a mixture consisting of 300 gm of N-methylolacrylamide, 400 gm of water and 200 gm of methanol, which was dosed in over a period of 6 hours. The dosing of the potassium persulfate solution was so effected during the polymerization that the cooling of the reactor was fully utilized up to the end of the monomer addition. An ethylene pressure of 82 atmospheres gauge was maintained during the polymerization so long until the dosing in of the monomers was completed. The potassium persulfate solution was added for another 3 hours, while the ethylene pressure dropped to 35 atmospheres gauge. The dispersion was cooled, then carefully expanded and liberated of foam and residual monomers by light evacuation.

A stable, finely-divided and coagulate-free emulsion was obtained with a 45% solids content and an ethylene portion of 41% by weight in the copolymer. The tensile strength of the sticky film was 0.8 N/mm$^2$. After tempering for 5 minutes at 150° C, the film became practically non-sticky, the tensile strength of the very plastic, elastic film rose to 3.0 N/mm$^2$ (see also Table 1).

COMPARISON EXAMPLE 5

The procedure was as in Example 4, but using, instead of butyl acrylate, the same amount of vinyl acetate and no acrylic acid in the monomer mixture.

A dispersion was obtained containing some coagulate, with a 45% solids content and an ethylene content of 40% by weight. The tensile strength of the untempered film was 0.6 N/mm$^2$, which rose after tempering to 2.1 N/mm$^2$ (see also Table 1).

EXAMPLE 6

The procedure was as in Example 1, but without adding palladium sol, hydrogen and potassium persulfate. Instead, 40 gm of ammonium persulfate dissolved in 500 cc of water and 20 gm of sodium formaldehyde-sulfoxylate dissolved in 500 cc of water were dosed in as a polymerization catalyst in two separate continuous streams, in such a way that the content of monomeric vinyl acetate and butyl acrylate in the reaction mixture was from 4 to 10% during the polymerization. The pH was maintained at 3 to 3.5 during the polymerization. A stable, coagulate-free dispersion was obtained with an ethylene content of 23% by weight. The tensile strength of the untempered film was 1.0 N/mm$^2$, that of the tempered film was 3.5 N/mm$^2$ (see also Table 1).

COMPARISON EXAMPLE 7

The procedure was as in Example 6, but the portion of butyl acrylate was replaced by vinyl acetate. A dispersion with a high coagulate content was obtained whose ethylene portion is 24% by weight (see also Table 1).

EXAMPLE 8

In the reactor described in Example 1, 3000 gm of water, 150 gm of methanol, 30 gm of the sodium salt of a mono-tridecanol sulfosuccinate which was etherified with ethylene oxide, 7 gm of sodium bicarbonate and 60 gm ammonium persulfate were charged. The solution was liberated of atmospheric oxygen, 55 atmospheres gauge of ethylene were empressed therein and the mixture was heated to 50° C under stirring. Then a pre-emulsion of 4000 gm of water, 150 gm of methanol and 30 gm of the above-mentioned sulfosuccinic acid half-ester, with 5400 gm of vinyl acetate, 600 gm of 2-ethylhexyl acrylate, 60 gm of acrylic acid, 100 gm of acrylamide, 400 gm of a 60% aqueous N-methylol acrylamide solution and 10 gm of triallyl cyanurate, which had been liberated of atmospheric oxygen, was added from a second closed stirring vessel at a constant rate of 2000 gm/hr. As a catalyst, 25 gm of sodium formaldehyde-sulfoxylate, dissolved in 700 gm of water, were added in such a way that a constant reaction velocity was obtained and the monomer content of the vinyl acetate and 2-ethylhexyl acrylate is from 4 to 10%. The ethylene pressure was maintained at 55 atmospheres gauge. After the addition of the pre-emulsion was ended, 10 gm of ammonium persulfate in 200 gm of water and the remaining sodium formaldehyde-sulfoxylate solution were dosed in. A stable, finely-divided dispersion was obtained with a solids content of 50% and an ethylene content of 26% by weight. The plastic film is viscous-elastic after tempering and has a tensile strength of 3.5 N/mm² (see also Table 1).

EXAMPLE 9

The procedure was as in Example 6, but on using in addition 40 gm of allyl methacrylate in the vinyl acetate/butyl acrylate mixture, a coagulate-free dispersion was obtained with an ethylene content of 23% by weight. The tensil strength of the untempered film was 1.8 N/mm², that of the tempered film was 5.2 N/mm² (see also Table 1).

TEST FOR SOLVENT-RESISTANCE (SEE TABLE 1)

a. Crosslinking Density (Swelling Index) And Degree Of Cross-linking

The dispersions were standardized with diluted phosphoric acid or with ammonia, respectively, to a pH of 4 and films of 0.2 mm thickness in the dry state were cast. These films were tempered for 5 minutes at 150° C, then pieces of a size of 15 × 30 mm were shaken for 4 hours in 250 gm of ethyl acetate. The swelling index results from the quotient of the weight of the swollen solvent-moist film to the weight of the dried film. From the latter can also be calculated the degree of crosslinking.

b. Resistance Of Non-woven Fabrics To The Action Of Trichloroethylene

A polyamide fleece, which contains 30% by weight of dispersion as a binder, was tempered for 3 minutes at 150° C. A piece of 100 × 100 mm was shaken vigorously for 30 minutes in trichloroethylene and its appearance was subsequently judged. The results obtained in this test correspond to those obtained after conventional five drycleaning cycles.

C. Test for Wet Strength

This test was so carried out that a polyamide fleece, which contained 30% by weight of dispersion as a binder, was tempered for 3 minutes at 150° C. A piece of 100 × 100 mm was heated for 50 minutes at 90° C in a wash liquor which contained 5 gm of a high temperature detergent per liter wash liquor while stirring the material being washed occasionally.

The results of these test employing the dispersions of the examples are given in the following Table I. In this table, the tensile strength is reported in units of N/mm². This is Newton per square millimeter.

TABLE I

Test of films of the copolymers for solvent resistance after crosslinking by tempering for 5 minutes at 150° C

| Example No. | According to Invention | % Ethylene | t.st.*(N/mm²) Not cross-linked | t.st.*(N/mm²) Cross-linked | Swelling Index | % of Cross-linkage | Web shaken in tri** | Wet strength Tested Web |
|---|---|---|---|---|---|---|---|---|
| 1 | Yes | 25 | 0.5 | 3.7 | 4.8 | 93 | Good | Very good |
| 2 | Comparison example | 25 | 0.5 | 2.5 | 11.0 | 82 | Disintegrated | Good |
| 3 | Yes | 12 | 2.5 | 6.5 | 3.5 | 95 | Very good | Very good |
| 4 | Yes | 41 | 0.8 | 3.0 | 6.0 | 95 | Good | Good |
| 5 | Comparison example | 40 | 0.6 | 2.1 | 9.0 | 80 | Disintegrated | Very good |
| 6 | Yes | 23 | 1.0 | 3.5 | 5.5 | 91 | Good | Very good |
| 7 | Comparison example | 24 | — | — | 8.0 | 86 | Moderate | Very good |
| 8 | Yes | 26 | 0.8 | 3.5 | 4.3 | 97 | Good | Very good |
| 9 | Yes | 23 | 1.8 | 5.2 | 2.9 | 97 | Good | Very good |

*t.st. - tensile strength
**tri - trichloroethylene

These tests demonstrate the improved solvent resistance after cross-linking and improved cross-linkability of the copolymers of the present invention.

The preceding specific embodiments are illustrative of the practice of the invention. It is to be understood however, that other expeedients known to those skilled in the art or disclosed herein may be employed without departing from the spirit of the invention or the scope of the appended claims.

We claim:

1. A thermally self-cross-linkable ethylene/vinyl acetate copolymer consisting essentially of the following monomer units:
   a. from 5 to 50% by weight of ethylene,
   b. from 30 to 87% by weight of vinyl acetate,
   c. from 2 to 10% by weight of mono-olefinically unsaturated compound capable of copolymerizing and containing an N-methylol group selected from the group consisting of N-methylol acrylamide, N-methylol methacrylamide, lower alkanol ethers thereof, and mixtures thereof,
   d. from 5 to 20% by weight of an acryl compound selected from the group consisting of alkyl acrylate and alkyl methacrylate where alkyl has from 1 to 10 carbon atoms,
   e. from 0.5 to 3% by weight of an unsaturated acid selected from the group consisting of alkenoic acids having from 3 to 6 carbon atoms and alkenedioic acids having from 4 to 6 carbon atoms, and
   f. from 0 to 1% by weight of a poly-olefinically-unsaturated monomer copolymerizable with vinyl acetate and ethylene, said copolymer having a glass transition temperature of between −40° and +10° C.

2. The ethylene/vinyl acetate copolymer of claim 1 wherein said component (f) is from 0.001 to 1% by weight.

3. The ethylene/vinyl acetate copolymer of claim 2 wherein said component (d) is from 8 to 15% by weight.

4. The ethylene/vinyl acetate copolymer of claim 1 wherein said component (f) is from 0.01 to 1% by weight of allyl acrylate.

5. The ethylene/vinyl acetate copolymer of claim 1 wherein said component (f) is from 0.01 to 1% by weight of allyl methacrylate.

6. A process for the production of the thermally self-cross-linkable ethylene/vinyl acetate copolymer of claim 1 consisting essentially of the steps of copolymerizing a monomer mixture of
a. ethylene in an amount sufficient to give from 5 to 50% by weight of monomer units in the final copolymer,
b. from 30 to 87% by weight of vinyl acetate,
c. from 2 to 10% by weight of a mono-olefinically unsaturated compound capable of copolymerizing and containing an N-methylol group selected from the group consisting of N-methylol acrylamide, N-methylol methacrylamide, lower alkanol ethers thereof, and mixtures thereof,
d. from 5 to 20% by weight of an acryl compound selected from the group consisting of alkyl acrylate and alkyl methacrylate where alkyl has from 1 to 10 carbon atoms,
e. from 0.5 to 3% by weight of an unsaturated acid selected from the group consisting of alkenoic acids having from 3 to 6 carbon atoms and alkenedioic acids having from 4 to 6 carbon atoms, and
f. from 0 to 1% by weight or a poly-olefinically-unsaturated monomer copolymerizable with vinyl acetate and ethylene, in an aqueous system in the presence of emulsifiers and free-radical-forming polymerization catalysts under an ethylene pressure of from 10 to 100 atmospheres guage at a temperature and for a time sufficient to effect copolymerization, and recovering said thermally self-cross-linkable ethylene/vinyl acetate copolymer having a glass transition temperature of between −40° C and +10° C.

7. The process of claim 6 wherein said ethylene pressure is from 20 to 80 atmospheres gauge.

8. The process of claim 6 wherein said component (f) is from 0.001 to 1% by weight.

9. The process of claim 6 wherein said copolymerizing step is conducted at such a rate that only from 4 to 10% by weight of said components (b) and (d) are present as monomers.

10. A process for producing ethylene/vinyl acetate copolymer films, coatings or bindings consisting essentially of the steps of forming a film, coating or binding of the thermally self-cross-linkable ethylene/vinyl acetate copolymer of claim 1 and heating said film from 110° to 170° C for a period sufficient to effect cross-linking.

* * * * *